US009754560B2

(12) United States Patent
Lanzi et al.

(10) Patent No.: US 9,754,560 B2
(45) Date of Patent: Sep. 5, 2017

(54) POOLING AND TILING DATA IMAGES FROM MEMORY TO DRAW WINDOWS ON A DISPLAY DEVICE

(75) Inventors: Matteo Lanzi, Bologna (IT); Piergiorgio Niero, Milan (IT)

(73) Assignee: Open Invention Network, LLC, Durham, NC (US)

( * ) Notice: Subject to any disclaimer, the term of this patent is extended or adjusted under 35 U.S.C. 154(b) by 63 days.

(21) Appl. No.: 13/589,543

(22) Filed: Aug. 20, 2012

(65) Prior Publication Data

US 2014/0049561 A1 Feb. 20, 2014

(51) Int. Cl.
*G09G 5/39* (2006.01)
*G02B 21/36* (2006.01)

(52) U.S. Cl.
CPC ......... *G09G 5/39* (2013.01); *G09G 2360/122* (2013.01)

(58) Field of Classification Search
CPC ...... G09G 5/14; G09G 5/395; G09G 2340/10; G09G 2340/12; G09G 2340/125; G09G 2360/12; G09G 2360/121; G09G 2360/122
USPC .......................................................... 345/634
See application file for complete search history.

(56) References Cited

U.S. PATENT DOCUMENTS 5,263,136 A * 11/1993 DeAguiar ........... G06F 12/0875 345/538
6,344,852 B1 * 2/2002 Zhu et al. ..................... 345/418
8,035,650 B2 * 10/2011 Du ........................ G06F 9/3802 345/542
8,654,135 B1 * 2/2014 Danskin ........................ 345/530
9,183,608 B2 * 11/2015 Akenine-Moller ..... G06T 11/40
2002/0063717 A1 * 5/2002 Minner .................. G06T 11/60 345/557
2003/0059096 A1 * 3/2003 Dekel et al. .................. 382/131
2007/0040849 A1 * 2/2007 Jeffrey .......................... 345/629
2007/0115288 A1 * 5/2007 Cronin et al. ................ 345/473
2007/0285439 A1 * 12/2007 King et al. .................... 345/638
2008/0143978 A1 * 6/2008 Damera-Venkata et al. ... 353/94
2009/0003714 A1 * 1/2009 Subramaniam ............... 382/232
2009/0083512 A1 * 3/2009 Godwin et al. ............... 711/173
2009/0160857 A1 * 6/2009 Rasmusson et al. ......... 345/422
2009/0199242 A1 * 8/2009 Johnson et al. ................ 725/46
2009/0208098 A1 * 8/2009 Yang ......................... G06T 1/60 382/164
2010/0146436 A1 * 6/2010 Jakobson et al. ............. 715/800
2010/0268694 A1 * 10/2010 Denoue et al. ............... 707/693
2011/0007094 A1 * 1/2011 Nash et al. ................... 345/634
2011/0137766 A1 * 6/2011 Rasmussen et al. ............ 705/30
2011/0142334 A1 * 6/2011 Abdo et al. ................... 382/165
2011/0145755 A1 * 6/2011 Bacus et al. .................. 715/784
2011/0148892 A1 * 6/2011 Shreiner et al. .............. 345/545
2011/0207446 A1 * 8/2011 Iwuchukwu ............... 455/414.3
2011/0227921 A1 * 9/2011 Redshaw ...................... 345/426
2011/0242430 A1 * 10/2011 Qi et al. ........................ 348/730
(Continued)

*Primary Examiner* — Ulka Chauhan
*Assistant Examiner* — Sae Won Yoon
(74) *Attorney, Agent, or Firm* — Haynes and Boone, LLP

(57) ABSTRACT

The instant application discloses receiving a command via a processor to initiate a window creation operation on a client computing device, retrieving at least one image tile pre-allocated in a memory of the client computing device, performing a draw operation that places at least one image overplayed onto the at least one image tile and displaying the image overplayed onto the at least one image tile on a display of the client computing device.

11 Claims, 6 Drawing Sheets

(56) References Cited

U.S. PATENT DOCUMENTS

| | | | | |
|---|---|---|---|---|
| 2012/0038662 | A1* | 2/2012 | Dicklin | G06F 17/30241 345/593 |
| 2012/0042275 | A1* | 2/2012 | Neerudu et al. | 715/781 |
| 2012/0124498 | A1* | 5/2012 | Santoro et al. | 715/765 |
| 2012/0254531 | A1* | 10/2012 | Urata et al. | 711/113 |
| 2012/0256949 | A1* | 10/2012 | Treat et al. | 345/629 |
| 2012/0301101 | A1* | 11/2012 | Busch | 386/224 |
| 2012/0320073 | A1* | 12/2012 | Mason | 345/581 |

* cited by examiner

100

200

250

POOLING AND TILING DATA IMAGES FROM MEMORY TO DRAW WINDOWS ON A DISPLAY DEVICE

FIELD

This application relates to pooling and tiling of data images, and in particular, to optimizing memory allocation and processing a data image(s) based on a pool of images used to create the data image(s).

BACKGROUND

When it comes to computer generated images, modern operating systems (OS) generate rich user graphic interfaces (GUI). The algorithms used today for drawing a GUI on the user display (i.e., monitor) continue to generate increasingly high quality images as the corresponding processing speed and related image processing applications continue to increase in quality.

The current GUIs of any version of Windows®, Linux®, Apple®, Android®, etc., are composed of thousands of images coupled together. The present GUIs continue to require the management of increasingly more memory resources. One common technique used to perform image processing is referred to as double buffering. This particular buffering technique is used to avoid image degradation and display problems, such as image flickering and image tearing.

Double buffering and other similar data processing techniques implemented by the operating system (OS), tend to rely on large amounts of memory to process image data. For example, when an OS performs memory allocation for any purpose, the addition and/or deletion of memory resources requires a certain amount of CPU utilization. In some cases, memory and/or CPU usage may be significant enough to affect the performance of other applications and resources operating on the same computer.

In computer graphics, double buffering is a technique for drawing graphics while reducing flickering, tearing, and other undesired effects. It is difficult for a program to draw an image display without pixels changing more than once. For instance, in order to update a page of text it is easier to clear the entire page and then begin inserting the letters rather than erasing all the pixels that are not in both the old and new letters. However, the intermediate work-in-progress images are observed by the user as image flickering. In addition, computer monitors constantly redraw the visible video page at about 60 times a second (i.e., 60 Hz refresh rate), so even a perfect update may be visible momentarily as having a horizontal divider between the "new" image and the un-redrawn "old" image, which is referred to as image tearing.

Double buffering operates by having all drawing operations store their results in some region of system random access memory (RAM), referred to as a "back buffer." When all drawing operations are complete, the whole region, or only the changed portion, is copied into the video RAM or "front buffer." This copying procedure is usually synchronized with the monitor's raster beam in order to avoid image tearing. However, double buffering requires more video memory and CPU time than single buffering due to the video memory allocated for the back buffer, the time for the copy operation, and the time waiting for synchronization. Furthermore, compositing window managers often combine the "copying" operation with "compositing", which is used to position windows and transform them with scale or warping effects and make certain portions transparent. As a result, the "front buffer" may contain only the composite image seen on the screen, while there is a different "back buffer" occupying additional memory for every window containing the non-composited image of the entire window contents.

SUMMARY

An example embodiment of the present application may include a method that includes receiving a command via a processor to initiate a window creation operation on a client computing device. The method may also include retrieving at least one image tile pre-allocated in a memory of the client computing device and performing a draw operation that places at least one image overplayed onto the at least one image tile. The method may also include displaying the image overplayed onto the at least one image tile on a display of the client computing device.

Another example embodiment may include an apparatus that includes a memory, a display, a receiver configured to receive a command to initiate a window creation operation, and a processor. The processor may be configured to retrieve at least one image tile pre-allocated in the memory, perform a draw operation that places at least one image overplayed onto the at least one image tile, and display the image overplayed onto the at least one image tile on the display.

DETAILED DESCRIPTION

It will be readily understood that the components of the present application, as generally described and illustrated in the figures herein, may be arranged and designed in a wide variety of different configurations. Thus, the following detailed description of the embodiments, as represented in the attached figures, is not intended to limit the scope of the claims, but is merely representative of selected embodiments.

The features, structures, or characteristics described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments, it may be applied to many types of network data, such as, packet, frame, datagram, etc. The term "message" also includes packet, frame, datagram, and any equivalents thereof. Furthermore, while certain types of messages and signaling are depicted in exemplary embodiments, they are not limited to a certain type of message or to a certain type of signaling.

Example embodiments disclose utilizing a memory pool(s) to pre-allocate a "pool of memory" during a start-up or a preliminary set of computer-based processing operations. The device performing the image pooling procedure may be a client computing device. Examples of such devices may be a computer, laptop, mobile, wireless or cellular phone, a PDA, a table, a client a server or any device that contains a processor and/or memory, whether that processor or memory performs a function related to an embodiment. The memory pool may be as large as a maximum amount of required memory. For example, every time that an application requires memory, the memory will be allocated from the memory pool and that particular memory "slot" will be marked as "locked" until that memory is no longer needed, then the locked marker may be removed.

Figure 1:
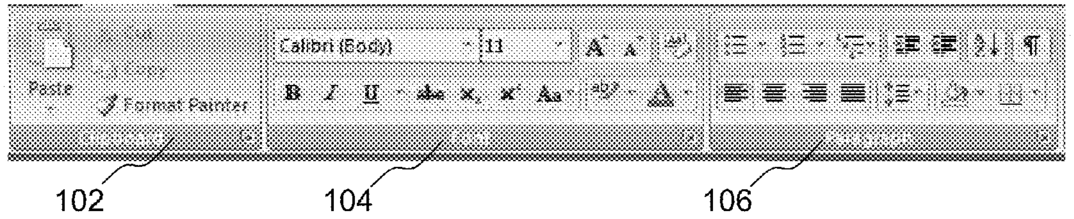
FIG. 1 PRIOR ART
FIG. 1 illustrates a common image presented to a client using a prior art double buffering method of creating such an image.

FIG. 1 illustrates a conventional image based on a corresponding image creation procedure. Referring to FIG. 1, the Microsoft Office® ribbon bar 100 is a fairly common but complicated image bar that is known to be created and managed with a conventional double buffering technique. A common implementation for managing such an image creation tool may include creating a bitmap file that is capable of containing all of the image bar components. Next, the background may be drawn including the corresponding gradient(s) and frame(s). Next, three images 102, 104 and 106 may be created and inserted which contain the major panel portions (e.g., clipboard, font and paragraph). The first image of the three panels (clipboard 102) may be created by drawing the background and the frame, drawing the background gradient, drawing the frame, loading all the images and icons needed from the OS and copying them onto the background while placing them into the correct position. Next, the text is drawn and the operations may be repeated for the font and paragraph portions of the bar.

Figure 2A:
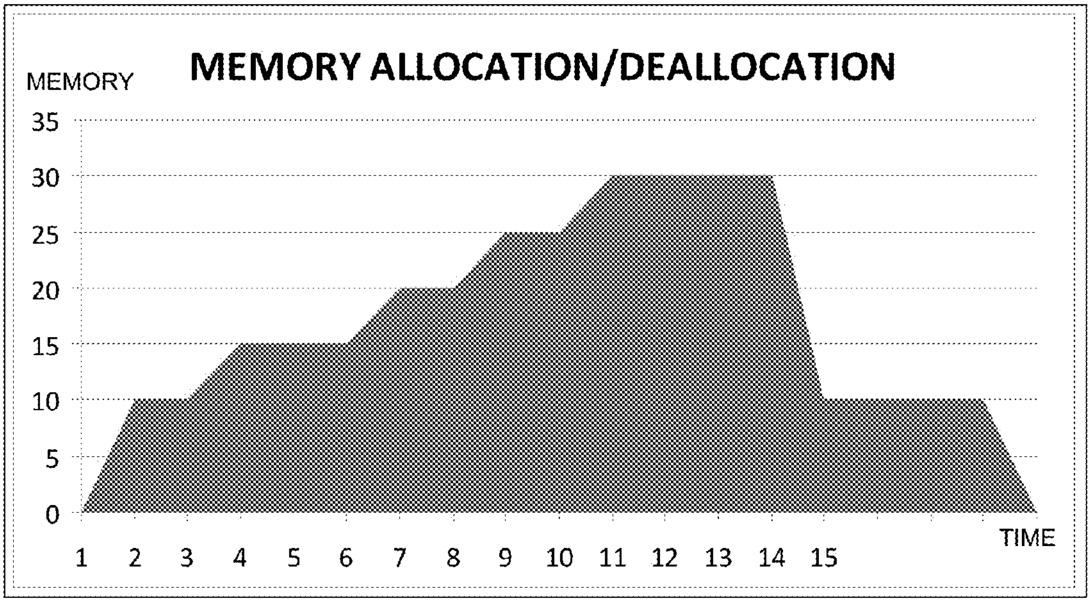
FIG. 2A PRIOR ART
FIG. 2A illustrates an example prior art memory utilization for image creation.

FIG. 2A illustrates a conventional memory use graph example corresponding to the above-noted example of FIG. 1. Referring to FIG. 2A, the graph 200 illustrates the continued allocation and de-allocation of memory during an image writing, compositing and/or displaying procedure over a predefined period of time. In this conventional example, the memory allocation and de-allocation causes the amount of memory utilized to increase almost continuously during an image writing procedure time period.

Figure 3:
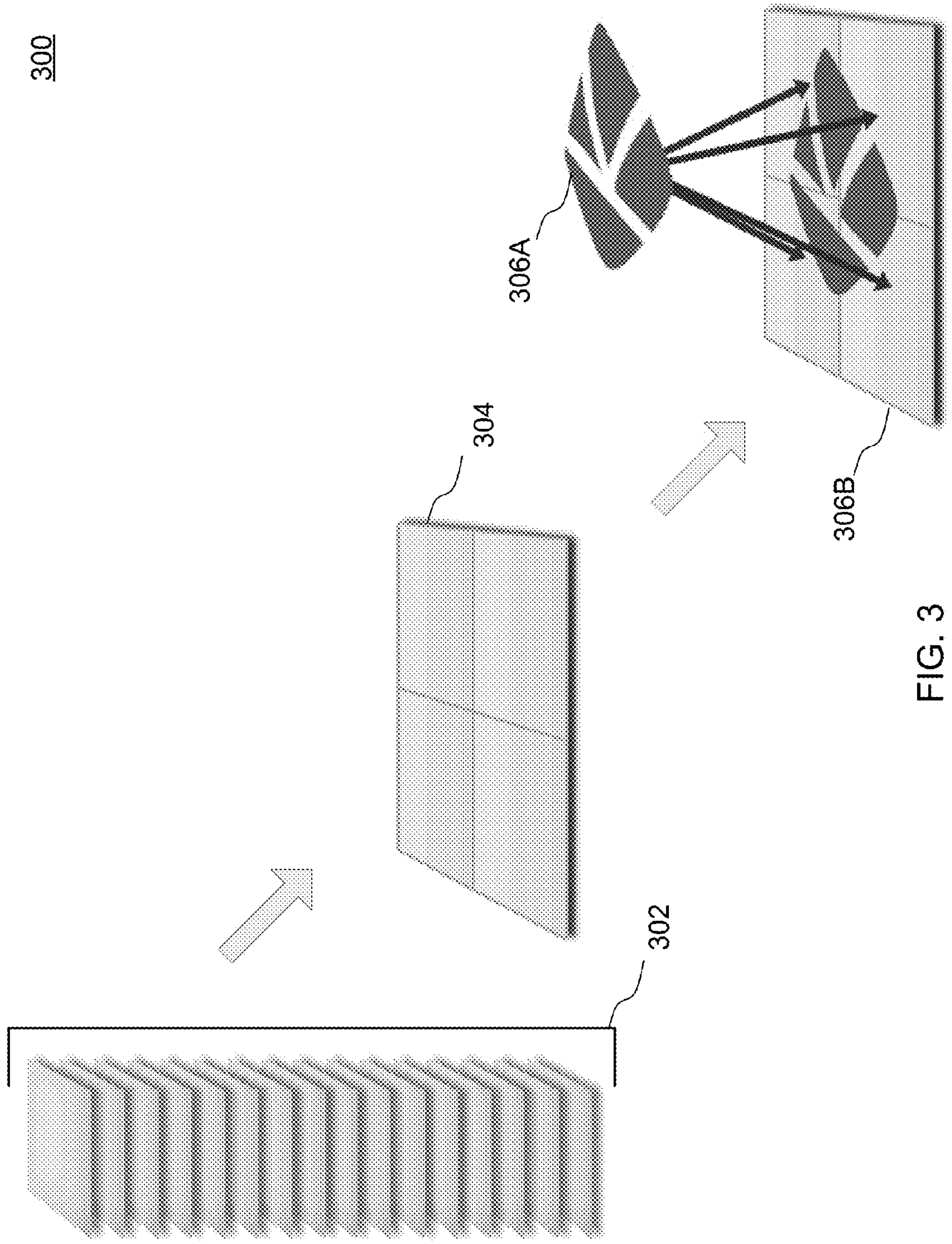
FIG. 3 illustrates an example procedure of memory and image pooling according to example embodiments.

According to example embodiments, the application of memory pooling to image creation and displaying provides an optimal configuration. FIG. 3 illustrates an example image pooling technique according to example embodiments. Referring to FIG. 3, images are 'pooled' on the client side as a set of fixed-sized images 302 created at the application start-up, and which are destroyed at the end of the application life cycle.

Figure 2B:
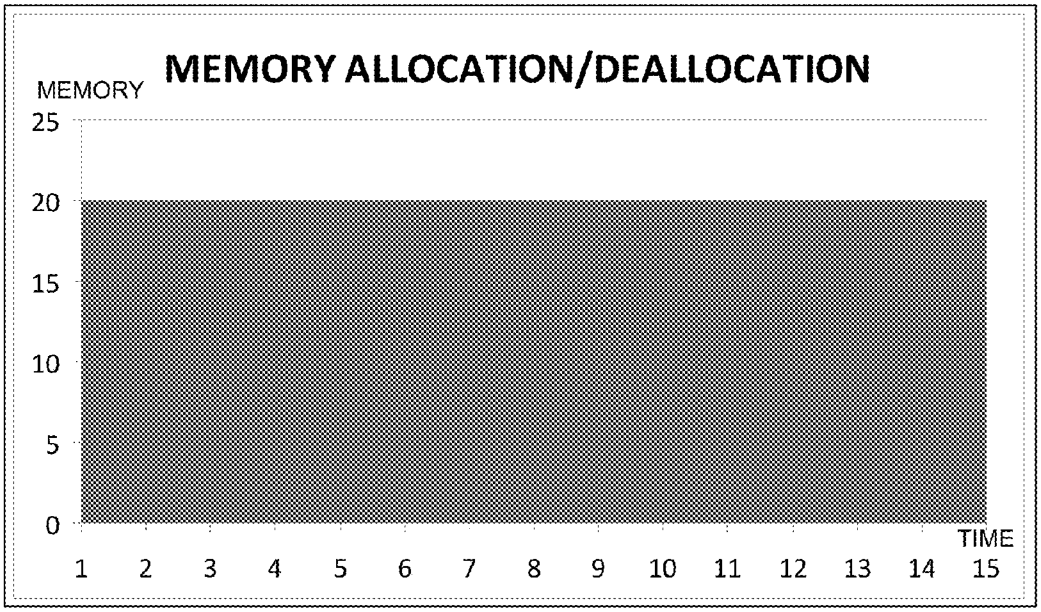
FIG. 2B illustrates memory utilization according to example embodiments.

The image pool 302 will "lock" a set of fixed size images having areas that should contain the requested image. These fixed-size images will be arranged as a set of virtual pooled tiles (four tiles) 304 similar to a tiled "mosaic", and the requested image 306A will be split for each tile of the mosaic as a completed image 306B. Images marked as "locked" will not be available until the system removes that marker. No allocation of the memory will be performed saving CPU usage and corresponding memory usage. In this example, the memory usage has already been allocated before the initiation of the image drawing procedure, and as a result the memory usage may appear like the graph 250 illustrated in FIG. 2B. In this case, the memory usage is constant and does not continue to increase for allocation purposes. Similarly, the de-allocation procedure is constant which allows the memory to be de-allocated once the image creation operation(s) is completed.

The set of images or image pool 302 may include a set of image tiles as part of a bitmap file created at the beginning of the client initiation process or prior to an image drawing operation. The bitmap may include a set (plurality) of tiles that are all characterized by a fixed dimension which does not change during the application lifecycle. The memory allocation cycle may require CPU resources and time. As a result, the bitmap tiles may be used on demand during the application lifecycle. According to one example, the application may require an image of 800×600 pixels. There may only be a set (pool) of images sized 64×64. To obtain an image of 800×600 some bitmaps may be retrieved from the pool. The obtained images may be arranged as a mosaic as illustrated in the fixed sized images 304. The images may be arranged as a set of virtual pooled tiles (i.e., four tiles) 304 similar to a tiled virtual "mosaic." Next, the requested sequence of pixels 306A may be drawn as an image onto the composited tiles as in 306B.

In order to virtualize an operating system (OS), the graphic commands may be sent using a remote desktop protocol (RDP) implementation utilizing an OS, such as Microsoft Windows or Spice from Red Hat. The image modifying tools may be implemented using a "thin" application. According to one example, if the remote client operating on the client device is a web application and it operates under a browser, the amount of memory and the CPU resources may be limited.

In order to create any kind of object in any kind of device requires time and CPU usage because the processor has to look in the whole memory and find a "hole" where to put that object. An object requires memory space, and a memory space spot requires time to be located. An operating system may initiate the drawing of thousand of images during an application lifecycle. Instead of allocating those images every time that the system requests an image, a set of (pool) of fixed sized images may be pre-allocated (i.e., 256×256), however the dimensions may change in the future, and thus the images may be positioned similar to a puzzle to create a virtual surface capable of containing the requested image(s) which can be drawn instantly by recalling the pre-allocated memory. By using image tiles, the memory does not need to be allocated or reallocated on demand and may instead be reused since the memory allocation has already been established.

According to example embodiments, the memory allocation used for image drawing and displaying is constant and does not require allocations of the memory on demand and/or de-allocation of memory on demand. The memory stability provides increased memory and CPU usage performance than other conventional virtualization systems which draw images onto display areas and within software applications. The image pooling and tiling procedure of the present application further provides the capability to manage large images and composite them in real-time or near real-time for user satisfaction. The compositing images may be incorporated into GUI displays and other software image structuring applications. In addition, image re-sizing may be performed without destroying the original image and creating a new one. Allocating and destroying memory usage in any system may have a large impact on the performance of memory and CPU usage. Example embodiments of the present application optimize image creation, resizing, and formatting/reformatting for managing "infinitely large" images.

The tiles may be pre-allocated in the memory either before or contemporaneous with the launching of the application, but before the image is drawn on the tiles. The tiles may include numerous little images pre-allocated in the memory. When an image needs to be displayed, an object may be created to allocate and/or encapsulate a number of tiles as required by the drawing operation. The tiles may be stored in different non-contiguous portions of the memory and may be recalled and combined into a bitmap file to create an image.

According to one example method of operation, a remote server may initiate a window creation operation by sending a remote command to a computing device to draw a particular window to include a particular object. As a result, the new window will be initiated and opened on a particular target computing device (i.e., a client device being controlled by the remote server). A window draw command may be intercepted and modified to include window drawing specific information used to draw the window based on the pooled tiles and corresponding images available in the existing memory space. For example, a window draw command may be intercepted and modified to include a specific dimension (i.e., 256×256, 800×600, 800×800, etc.) that matches the tiles and the combination of tiles (i.e., mosaic) pre-allocated in the memory of the computing device. Other information may be modified to include a client device monitor location to draw the image onto the tiles. The client side may receive the command message and unpack the contents of the message. At this stage in the image drawing procedure, no images have been sent prior to the image memory allocation and tiling procedure.

On the receiving side of the client computing device, the client may retrieve as many tiles from the memory pool as required to create a mosaic that matches the size of the window (e.g., 1 tile, 2 tiles, 4 tiles, 16 tiles, etc.). The tiles may be arranged in memory as a virtual mosaic surface that accommodates the requested window and/or image size to be drawn on the client monitor device. In general, the tiles should yield a surface size that is larger than the dimensions of the requested image. The remote operating system (OS) should send commands to the client computing device, such as, draw a white background of the window, draw a line(s), draw the border of the window, place the icon/image in a first position, place the tiles in the same first position. All the drawing operations received may be applied to the pre-allocated and recently created mosaic surface window of tiles. The image overlay 306A may be drawn onto the pre-existing and pre-allocated image tiles 306B. As a result, the images are drawn increasingly efficiently and without delay as the pre-allocated memory provides a source of memory for the operating system's of the client and server devices to anticipate the image drawing operations.

Figure 4:
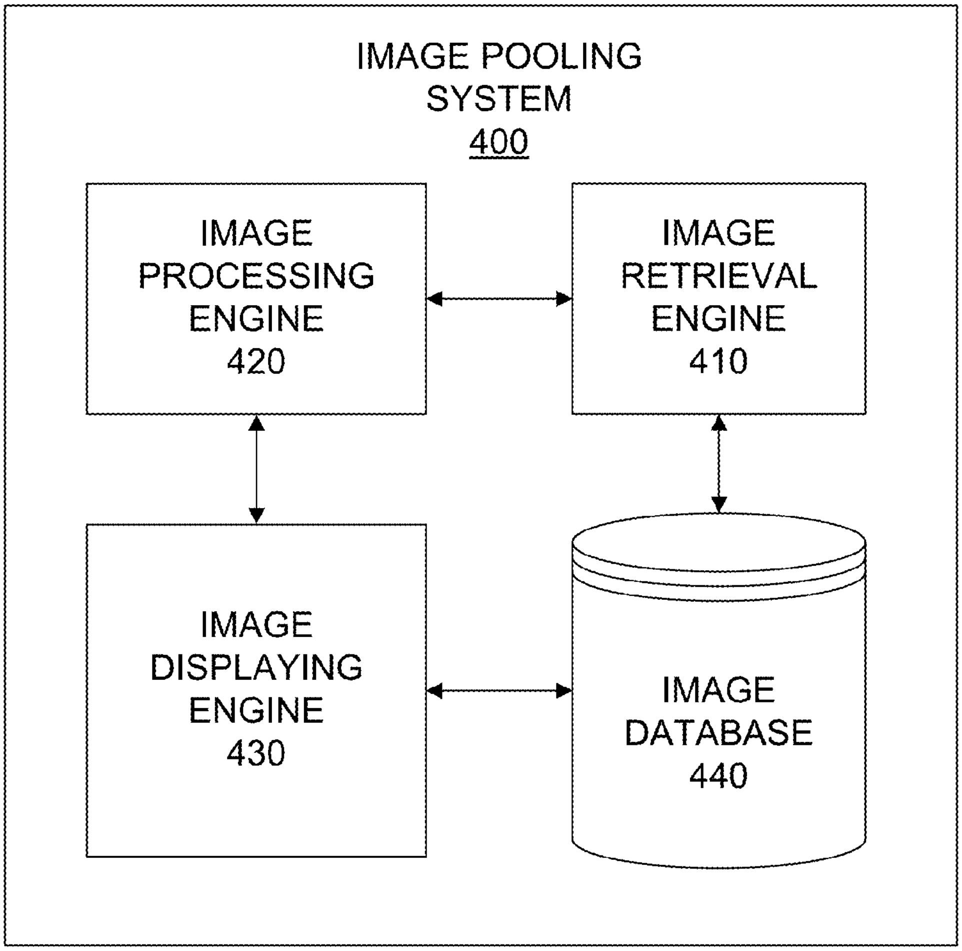
FIG. 4 illustrates an example image pooling system configured to perform the operations according to one or more example embodiments.

FIG. 4 illustrates an example image pooling system 400 that may be used to draw the images on a client display device. Referring to FIG. 4, an image database 440 may be used to store image data and/or image tile information on the client computer device or a remote storage device accessible to the client computer device. One example method of operation may include the image pooling system 400 receiving a command to initiate a window creation operation on a client computing device. The image retrieval engine 410 may retrieve at least one image tile pre-allocated in a memory of the client computing device. The image processing engine 420 may perform a draw operation that places at least one image overplayed onto the at least one image tile. The image display engine 430 displays the image overplayed onto the at least one image tile on a display of the client computing device. The window creation command may include instructions to draw a window comprised of the at least one image tile and to draw the image overplayed onto the at least one image tile. The image tile may include a plurality of image tiles which are pre-allocated in the memory prior to receiving the command. The image retrieval engine 410 may also perform selecting a number of the plurality of image tiles which together comprise a display area that is larger than the at least one image overplayed onto the plurality of image tiles. The command may include instructions to draw a background of the window, draw a line of the window, draw a border of the window, place the at least one tile in a first position of the window and place the at least one image in a first position within the area of the at least one tile. The command received from the remote web server is executed on the client computing device and the displayed image may be a bitmap file.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of the other figures presented.

Figure 5:
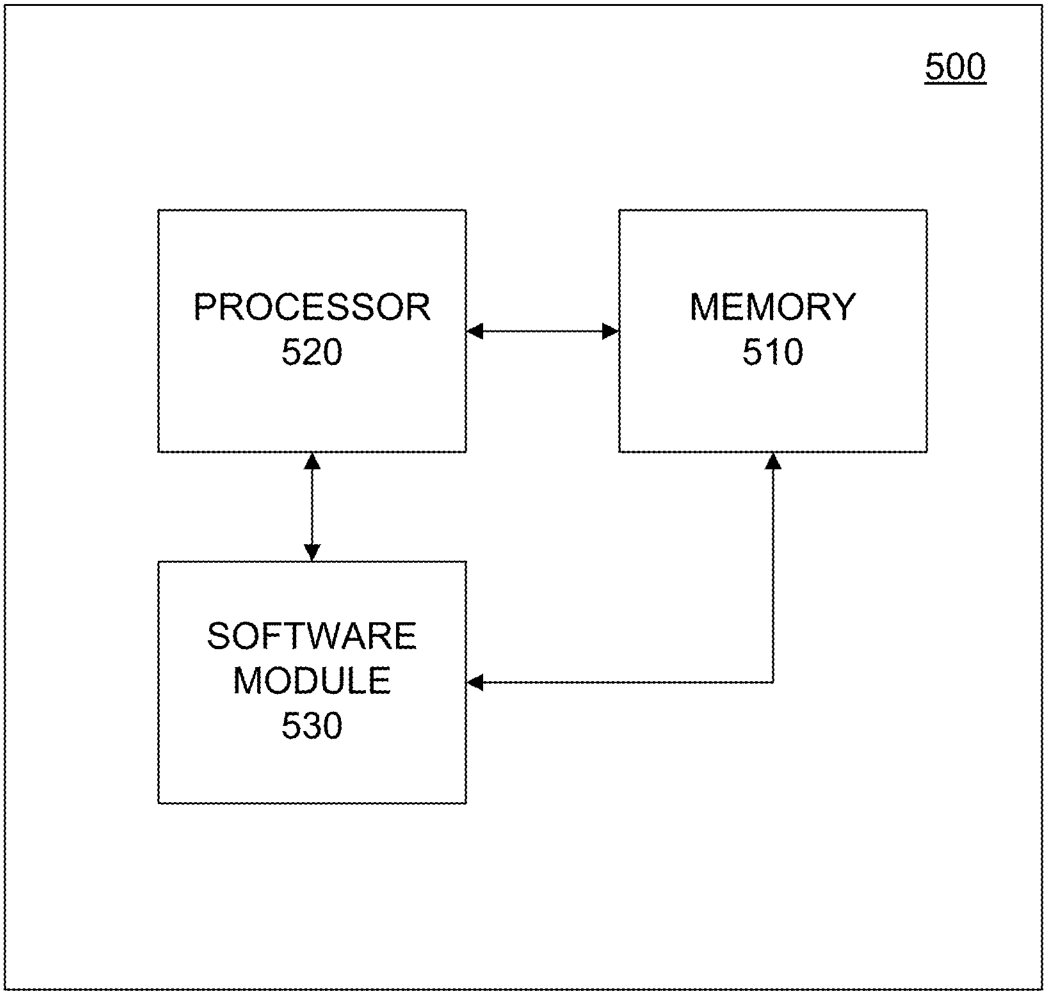
FIG. 5 illustrates an example network entity device configured to store instructions, software, and corresponding hardware for executing the same, according to example embodiments.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Figure 6:
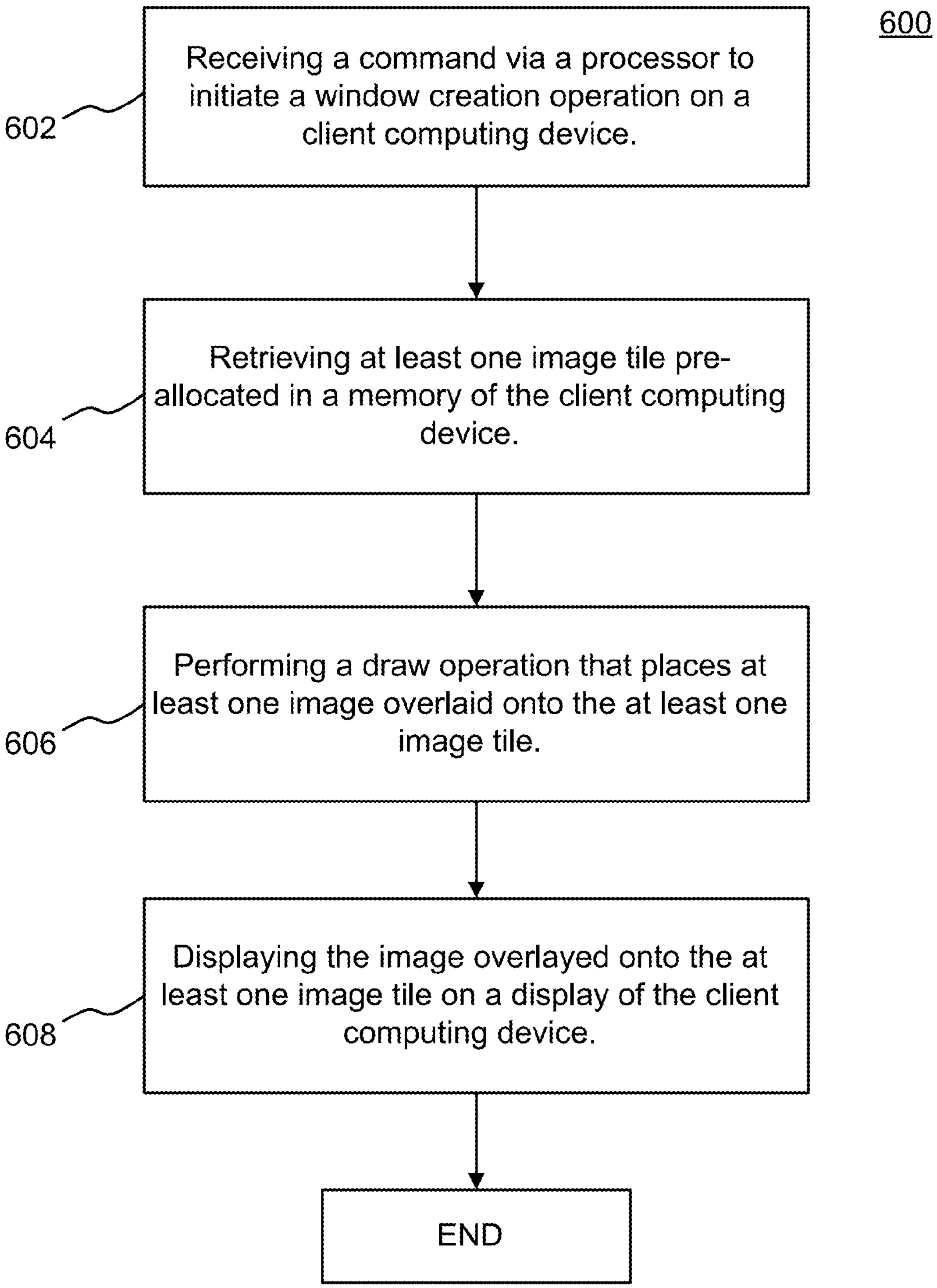
FIG. 6 illustrates an example method flow diagram, according to example embodiments.

FIG. 6 illustrates one example method of operation according to example embodiments which may include a method 600 of receiving a command via a processor to initiate a window creation operation on a client computing device, at operation 602, retrieving at least one image tile pre-allocated in a memory of the client computing device, at operation 604, and performing a draw operation that places at least one image overplayed onto the at least one image tile, at operation 606. The method may also include displaying the image overplayed onto the at least one image tile on a display of the client computing device, at operation 608.

Although an exemplary embodiment of the system, method, and computer readable medium has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system 400 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It is to be understood that the above description is intended to be illustrative, and not restrictive. Many other embodiments will be apparent to those of skill in the art upon reading and understanding the above description. Although the present application has been described with reference to specific exemplary embodiments, it will be recognized that the application is not limited to the embodiments described, but can be practiced with modification and alteration within the spirit and scope of the appended claims. Accordingly, the specification and drawings are to be regarded in an illustrative sense rather than a restrictive sense. The scope of the application should, therefore, be determined with reference to the appended claims, along with the full scope of equivalents to which such claims are entitled.

What is claimed is:

1. A method, comprising:

receiving a command via a processor to initiate a window creation operation on a client computing device;

retrieving a plurality of image tiles as a set of image tiles, each of the plurality of image tiles having a fixed size, wherein a combined size of the set of image tiles is equal to or greater than a surface area size of at least one image;

arranging the set of image tiles as a mosaic with a surface size that is larger than dimensions of the at least one image;

locking the set of the image tiles in the mosaic causing the set of image tiles to remain unavailable until a marker is removed;

pre-allocating a fixed size of memory of the client computing device to accommodate the combined size of the set of the image tiles prior to drawing the at least one image;

performing a draw operation that draws the at least one image overplayed onto the plurality of image tiles stored in the memory without pre-allocating separate memory for the at least one image, and wherein the draw operation splits the at least one image and places the at least one image in a partial area occupied by each of the plurality of image tiles disposed within an area of a window;

displaying the image overplayed onto the plurality of image tiles on a display of the client computing device; and maintaining the fixed size of the pre-allocated memory during the at least one image being drawn and overplayed onto the plurality of image tiles.

2. The method of claim 1, wherein the command comprises instructions to draw a background of the window, draw a line of the window, draw a border of the window, place at least one image tile of the plurality of image tiles in a first position area of a plurality of position areas together which occupy the area of the window.

3. The method of claim 1, wherein the command is received from a remote web server and is executed on the client computing device.

4. The method of claim 1, wherein the displayed image is a bitmap file.

5. An apparatus, comprising:

a memory;

a display;

a receiver configured to receive a command to initiate a window creation operation; and a processor configured to retrieve a plurality of image tiles as a set of image tiles, each of the plurality of image tiles having a fixed size, wherein a combined size of the set of image tiles is equal to or greater than a surface area size of at least one image;

arrange the set of image tiles as a mosaic with a surface size that is larger than dimensions of the at least one image;

locking the set of the image tiles in the mosaic causing the set of image tiles to remain unavailable until a marker is removed;

pre-allocate a fixed size of memory of the client computing device to accommodate the combined size of the set of the image tiles prior to drawing the at least one image;

perform a draw operation that draws the at least one image overplayed onto the plurality of image tiles stored in the memory without pre-allocating separate memory for the at least one image and wherein the draw operation splits the at least one image and places the at least one image in a partial area occupied by each of the plurality of image tiles disposed within an area of a window, and display the image overplayed onto the plurality of image tiles on the display and maintain the fixed size of the pre-allocated memory during the at least one image being drawn and overplayed onto the plurality of image tiles.

6. The apparatus of claim 5, wherein the command comprises instructions to draw a background of the window, draw a line of the window, draw a border of the window, place at least one image tile of the plurality of image tiles in a first position area of a plurality of positions areas together which occupy the area of the window.

7. The apparatus of claim 5, wherein the command is received from a remote web server.

8. The apparatus of claim 5, wherein the displayed image is a bitmap file.

9. A non-transitory computer readable storage medium configured to store instructions that when executed causes a processor to perform:

receiving a command via a processor to initiate a window creation operation on a client computing device;

retrieving a plurality of image tiles as a set of image tiles, each of the plurality of image tiles having a fixed size, wherein a combined size of the set of image tiles is equal to or greater than a surface area size of at least one image;

arranging the set of image tiles as a mosaic with a surface size that is larger than dimensions of the at least one image;

locking the set of the image tiles in the mosaic causing the set of image tiles to remain unavailable until a marker is removed;

pre-allocating a fixed size of memory of the client computing device to accommodate the combined size of the set of the image tiles prior to drawing the at least one image;

performing a draw operation that draws the at least one image overplayed onto the plurality of image tiles stored in the memory without pre-allocating separate memory for the at least one image, and wherein the draw operation splits the at least one image and places the at least one image in a partial area occupied by each of the plurality of image tiles disposed within an area of a window;

displaying the image overplayed onto the plurality of image tiles on a display of the client computing device; and maintaining the fixed size of the pre-allocated memory during the at least one image being drawn and overplayed onto the plurality of image tiles.

10. The non-transitory computer readable storage medium of claim 9, wherein the command comprises instructions to draw a background of the window, draw a line of the window, draw a border of the window, place at least one image tile of the plurality of image tiles in a first position area of a plurality of position areas together which occupy the area of the window.

11. The non-transitory computer readable storage medium of claim 9, wherein the command is received from a remote web server and is executed on the client computing device, and the displayed image is a bitmap file.

* * * * *